United States Patent Office 2,985,472
Patented May 23, 1961

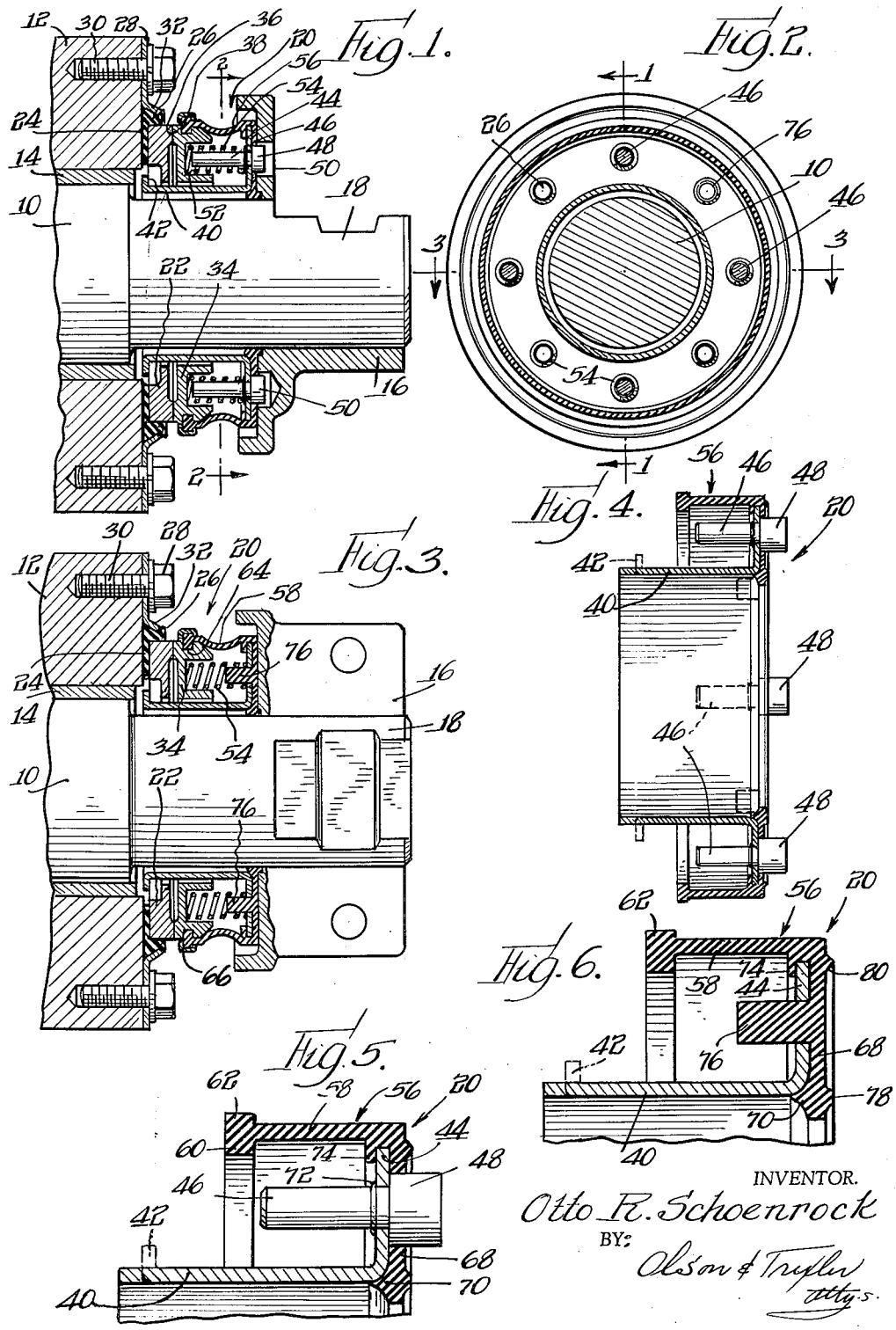

2,985,472
BEARING-SEAL CONSTRUCTION
Otto R. Schoenrock, 138 N. Taylor Ave., Oak Park, Ill.
Filed Apr. 19, 1957, Ser. No. 653,841
7 Claims. (Cl. 286—11)

This invention relates to a shaft seal for locating a lubricant in the vicinity of a bearing between a pair of relatively rotatable members.

It is an object of this invention to provide a lubricant seal of simple and economical construction.

More particularly, it is an object of this invention to provide, in a lubricant seal of the type having a pair of relatively rotatable rings urged into sealing engagement, a plurality of locating members which simultaneously locate one of the rings relative to another part, and serve as spring anchors for springs biasing the rings into sliding engagement.

It is another object of this invention to provide, in a seal of the type having a pair of rings resiliently urged into sealing engagement, a plurality of members serving the dual function of anchoring biasing springs and locating one of said rings relative to another part, wherein there are more springs than there are of such locating members, and ancillary parts are provided for anchoring such additional springs.

Other and further objects and advantages of the present invention will be understood with reference to the accompanying drawings when taken in connection with the following descriptive material.

In the drawings:

Fig. 1 is a longitudinal sectional view of an installation embodying the seal forming the subject matter of this invention, the section being taken along the line 1—1 in Fig. 2;

Fig. 2 is a cross sectional view along the line 2—2 in Fig. 1;

Fig. 3 is a view similar to Fig. 1, but taken at a position rotated 90 degrees thereof as indicated along the line 3—3 in Fig. 2;

Fig. 4 is a longitudinal sectional view of a portion of the seal;

Fig. 5 is an enlarged fragmentary sectional view of a part of the seal shown in Fig. 4; and Fig. 6 is a view similar to Fig. 5, but taken along the section of Fig. 3.

Referring now in greater particularity to the drawings, there will be seen a shaft 10 on which a rotary member 12 is journaled by means of a bearing 14. The bearing 14 is shown simply as a sleeve bearing, but it will be understood that a ball or roller bearing could be used. A cap or casting 16 is fixed on the extending end 18 of the shaft in any suitable manner, and locates a bearing seal structure identified generally by the numeral 20.

More particularly, the bearing seal structure 20 includes a sliding or sealing ring 22 to which is bonded a rubber disc or washer 24 having a circumferential flange 26 overlying a portion of the circumference of the ring 22. Preferably, the washer 24 is bonded to the ring 22 by having the ring inserted in a mold and the washer then being molded directly against the ring. A sheet metal annular retaining member 28 is secured against the outer face of the rotatable member 12 by means of bolts 30 extending through the retainer 28 and threaded into suitable tapped apertures in the rotatable member 12. The retainer member 28 is provided at its inner margin with a deflected or beveled frusto-conical skirt 32 which clamps against the flange 26 of the washer whereby to secure the washer 24 and the slide or sealing ring 22 to the rotatable member 12 for rotation therewith, and hence to mount the entire bearing seal, as will be apparent hereinafter.

A fixed slide or sealing ring 34 is mounted adjacent the rotatable ring 22 and, as will be apparent hereinafter, the fixed ring is resiliently pressed against the rotatable ring. The rings may be made of cast iron or of other suitable material such as ceramic, steel or "Bakelite," and are provided with relatively narrow annular bearing faces 36 and 38, respectively, which are in sliding engagement with one another.

The two rings 22 and 34 are provided with inner diameters which are substantially greater than the corresponding diameter of the extending shaft end 18. A cylindrical shield 40 extends between the two rings and the end 18 of the shaft 10, but out of contact with these parts. At the left end as viewed in the drawings, the shield 40 is provided with an outwardly directed annular flange 42 (Figs. 1 and 3) of limited extent. This flange initially extends axially as is shown in Figs. 4–6 and subsequently is bent radially outwardly behind the ring 22, whereby all of the parts of the bearing seal are held together as a package unit. At the opposite end, the cylindrical shield is provided with a circumferential flange 44 having an outer diameter substantially equal to that of the rings 22 and 34. The circumferential flange 44 is provided with eight equally spaced apertures, and four metallic pins 46 are press fitted or swaged in four of the holes or apertures displaced at 90 degrees from one another. The pins 46 are provided with enlarged heads 48, and these heads are received in apertures or recesses 50 in the cap 16 whereby to insure locking of the pins relative to the shaft 10 and thereby to retain the shield 40 stationary. Furthermore, the ends of the pins 46 extend into niches 52 arcuately spaced about the fixed ring 34 whereby to prevent rotation of the ring 34 relative to the shaft 10. Helical springs 54 surround the pins 46 and are seated in the niches 52, and the fixed ring 34 thus is resiliently biased against the rotatable ring 22.

A shroud or shield 56 is molded with and hence is bonded to the shield 40, particularly the circumferential flange 44 thereof. The shroud comprises a cylindrical body portion 58 terminating at the left end in a flange 60 extending radially inwardly, and a flange 62 extending radially outwardly. The inwardly extending flange 60 is received in an annular recess 64 in the fixed ring and a sheet metal retaining ring 66 encircles the outwardly extending flange 62 and hold the inner flange in the recess as aforesaid. The retaining ring has a U-shaped cross section opening inwardly of the ring as will be apparent in the drawings.

At the opposite end the shroud 56 includes a radially inwardly extending flange 68 of substantial axial extent. This flange extends inwardly beyond the cylindrical shield 40 and has a part 70 overlapping the corner of the shield. The shroud helps to hold the pins 46 in place and the pins further are swaged outwardly slightly as at 72 to insure that they will remain in place. Furthermore, the pins could be welded or otherwise secured in place. A shallow inwardly extending flange 74 also is formed on the shroud 56 and this flange lies on the opposite side of the shield flange 44 from the flange 68.

The shroud further is formed with four rubber anchor members in the form of pins 76 which project through the four remaining apertures in the flange 44. Thus, the four rubber pins 76 are displaced 90° from one another and 45° from the pins 46. Besides helping to lock the shroud to the shield, the rubber pins 76 serve as anchors for four additional helical springs 54, there thus being eight springs in all, equally arcuately spaced about the fixed ring 34 and preventing deflection of the ring such as might occur if there were less than the eight springs.

The flange 68 is provided on its outer face with a pair of raised ridges 78 and 80, respectively, to provide a better engagement with the cap 16.

As will be apparent from Figs. 1 and 3, the cylindrical wall 58 of the shroud is collapsed slightly inwardly (or outwardly) when the parts are installed position thereby providing for takeup if the slide rings should move relatively toward one another as a result of wear, or if the rotatable member should tilt slightly on the shaft, or to compensate for other variations.

As now will be apparent, the seal as provided herein is of relatively simple construction, particularly in that the pins 46 are readily assembled with the flange 44 of the shield 40. Furthermore, the pins 46 serve a dual function; namely, that of anchoring certain of the biasing springs 54 while also serving to anchor the stationary ring 34 to the shield and to the cap 16 fixed on the shaft. The rubber protuberances or pins 76 also serve dual functions in that they anchor additional springs 54 and provide a firmer connection with the flange of the shield. Thus, there is a greater number of springs 54 than there is of the metal pins 46. It will be appreciated that the eight equally spaced springs prevent deflection of the fixed ring 34.

It will be understood that the specific example of the invention as herein shown and described is for illustrative purposes only. Various changes in structure will no doubt occur to those skilled in the art, and will be understood as forming a part of the invention insofar as they fall within the spirit and scope of the appended claims.

Invention is claimed as follows:

1. A bearing-seal construction comprising a first seal ring, a second seal ring concentric with the first and rotatable relative thereto, an annular member concentric with said seal rings, a plurality of pins carried by said annular member extending substantially parallel to the axis thereof toward the second seal ring, said second seal ring having apertures in the face thereof confronting said pins and receiving said pins whereby said second seal ring is rotationally fixed relative to said annular member, a cover of flexible material extending between and over said second seal ring and said annular member and radially inwardly along said annular member on the face thereof opposite said second seal ring, projections on said cover member parallel to said pins and spaced arcuately thereof, and a plurality of coil springs seated in said apertures encircling said pins and said projections and compressed between said annular member and said second seal ring whereby resiliently to urge said second seal ring against said first seal ring.

2. A bearing-seal construction comprising a first seal ring, a second seal ring concentric with the first and rotatable relative thereto, an anchor member coaxial with said seal rings, an annular member coaxial with said anchor member and said seal rings, a plurality of equally arcuately spaced pins carried by said annular member and extending substantially axially thereof toward the second seal ring, said second seal ring having apertures in a face thereof and receiving said pins whereby said second seal ring is anchored, a cylindrical cover extending between said second seal ring and said annular member and having a flange thereon extending radially inwardly along said annular member between said annular member and said anchor member, said pins having rearward projections thereon extending through said flange and received in apertures in said anchor member rotationally to lock said annular member and said second seal ring, axial protuberances on said flange extending through apertures in said annular member parallel to said pins and equally arcuately spaced among said pins, said projections being terminated short of said second seal ring, and a plurality of coil springs respectively encircling said pins and said projections and compressed between said second seal ring and said annular member whereby said second seal ring is held resiliently against the first seal ring and the annular member abuts the anchor member through the flange.

3. A bearing-seal construction comprising a first seal ring, a second seal ring concentric with the first and rotatable relative thereto, both of said seal rings being free central bores, a cylindrical shield in the bores of said seal rings and extending beyond said rings axially thereof in a given direction on the opposite side of said second seal ring relative to the first seal ring, said shield having an outwardly extending radial flange at the end thereof in said given direction, an anchor member fixed beyond said shield flange, a plurality of pins carried by said shield flange in equally arcuately spaced arrangement extending axially of said shield toward the second seal ring, said second seal ring having apertures therein receiving said pins whereby said second seal ring is anchored rotationally relative to said pins, said pins having rearwardly extending portions received in apertures in said anchor member whereby the pins and the second seal ring are rotationally anchored, a cover of rubber-like material extending between and over the second seal ring and the shield flange, said cover having a radially inwardly extending flange thereon lying along the face of the shield flange between the shield flange and the anchor member, said cover flange having integral projections thereon extending through apertures in the shield flange, said projections extending parallel to said pins and being equally arcuately spaced intermediate the pins, said projections terminating short of said second seal ring, and a plurality of coil springs respectively encircling said pins and said projections and compressed between the shield flange and the second seal ring whereby the second seal ring is resiliently biased against the first seal ring and the shield flange is held in abutting relation against the anchor member through the cover flange, said cylindrical shield being free of contact with the two seal rings.

4. A bearing-seal unit comprising a first seal ring having a predetermined internal diameter, a second seal ring having a second predetermined internal diameter and concentric with the first seal ring and rotatable relative thereto, said seal rings having confronting sliding sealing surfaces, a cylindrical member passing through both of said sealing rings and having an outwardly extending radial flange at one end with an outside diameter greater than the internal diameter of said first seal ring whereby to prevent retraction of said cylindrical member from said first seal ring, said cylindrical member at the opposite end having a second outwardly extending radial flange positioned beyond said second seal ring and having an outside diameter greater than the internal diameter of the second seal ring, a plurality of pins on said flange in arcuately spaced arrangement extending axially of said cylindrical member toward the second seal ring, said second seal ring having apertures therein receiving said pins whereby said second seal ring is anchored rotationally relative to said cylindrical member, a cover of rubber-like material extending between and over the second seal ring and the second flange and having a radially inwardly projecting flange thereon lying along the face of said second flange opposite to said sealing rings, said cover flange having integral projections thereon extending through apertures in the shield flange, said projections extending parallel to said pins and being arcuately spaced, said projections terminating short of said second seal ring, and a plurality of coil springs respectively encircling said pins and said projections and compressed between said second flange and said second seal ring resiliently to bias said second seal ring against said first seal ring.

5. A bearing-seal construction comprising a first seal ring, a second seal ring concentric with the first and rotatable relative thereto, a substantially flat annular member concentric with said seal rings and spaced axially from said second seal ring on the opposite side thereof from the first seal ring, a cylindrical retainer joined to said annular member at the inner margin thereof and extending axially through both of said seal rings and having means thereon preventing axial movement of said seal rings therefrom, means interconnecting said annular member and the second seal ring for rotationally locking the annular member and the second seal ring together, a covering of flexible material extending between and over said second seal ring and said annular member and radially inwardly along said annular member on the face thereof opposite said second seal ring to the inner margin of said annular member, and a flange on said cover extending radially inwardly along the face of said annular member on the side toward the second seal ring.

6. A bearing-seal construction as set forth in claim 5 and further including a plurality of arcuately spaced coil springs compressed between the annular member and the second seal ring whereby resiliently to urge the second seal ring against the first seal ring.

7. A bearing-seal construction as set forth in claim 5 wherein the second seal ring is provided with an annular groove in its outer surface, and further including an inwardly directed annular flange on said cover received in said groove, a radially outward extension on said cover opposite to said last mentioned flange, and a metallic ring encircling said projection and holding the last-mentioned flange in said groove.

References Cited in the file of this patent

UNITED STATES PATENTS

| | | |
|---|---|---|
| 2,695,799 | Chambers et al. | Nov. 30, 1954 |
| 2,701,154 | Dolhun | Feb. 1, 1955 |
| 2,736,624 | Schoenrock | Feb. 28, 1956 |
| 2,797,939 | Laser | July 2, 1957 |